April 22, 1958     I. A. WEAVER     2,831,264
WHEEL ALIGNMENT GAUGE
Filed April 30, 1953     4 Sheets-Sheet 3
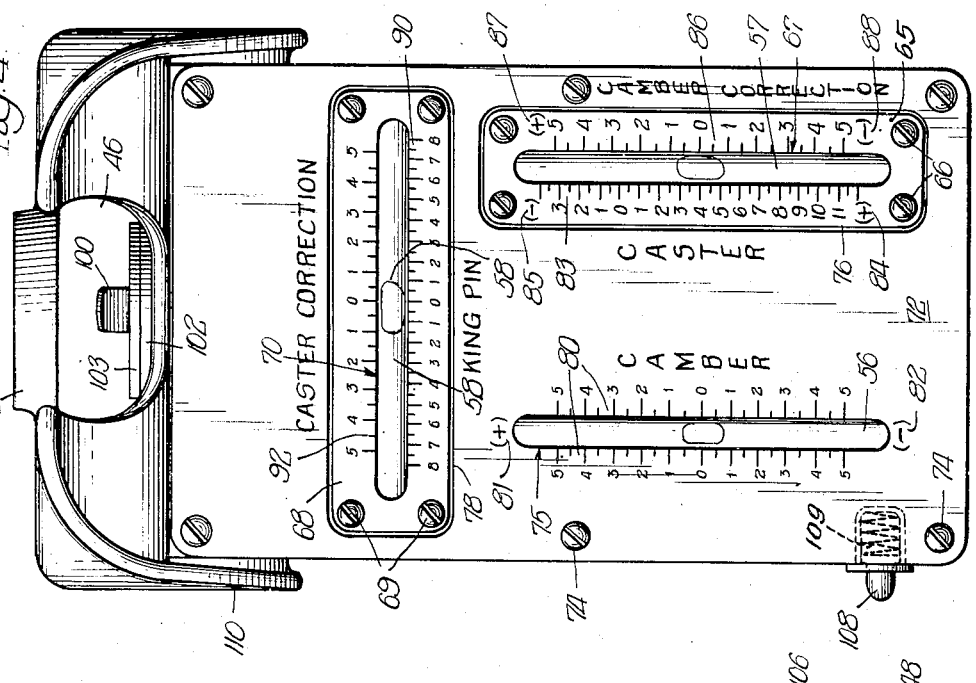
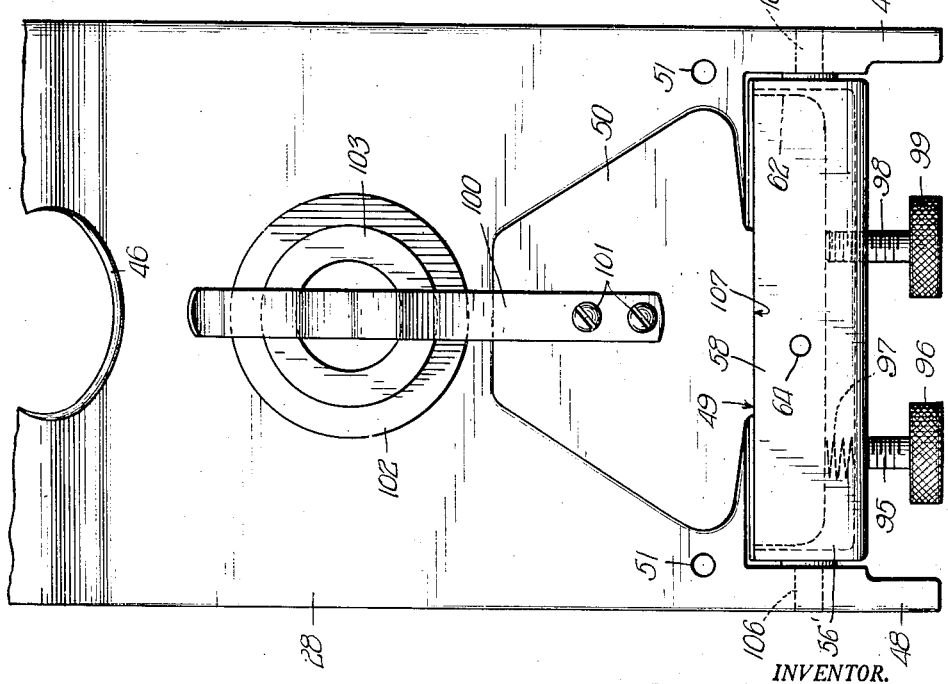
INVENTOR.
Ira A. Weaver,
BY INVENTOR.
Ira A. Weaver,
BY United States Patent Office 2,831,264
Patented Apr. 22, 1958

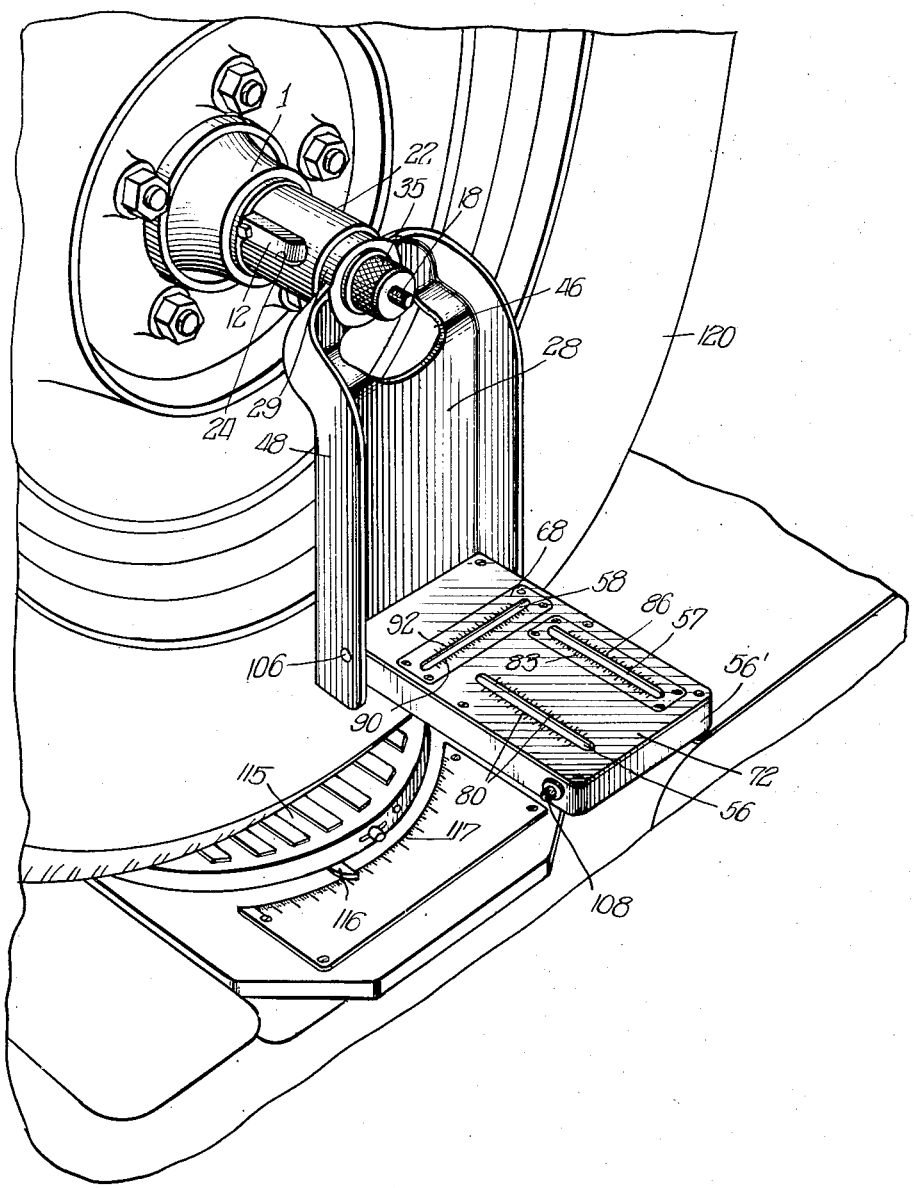

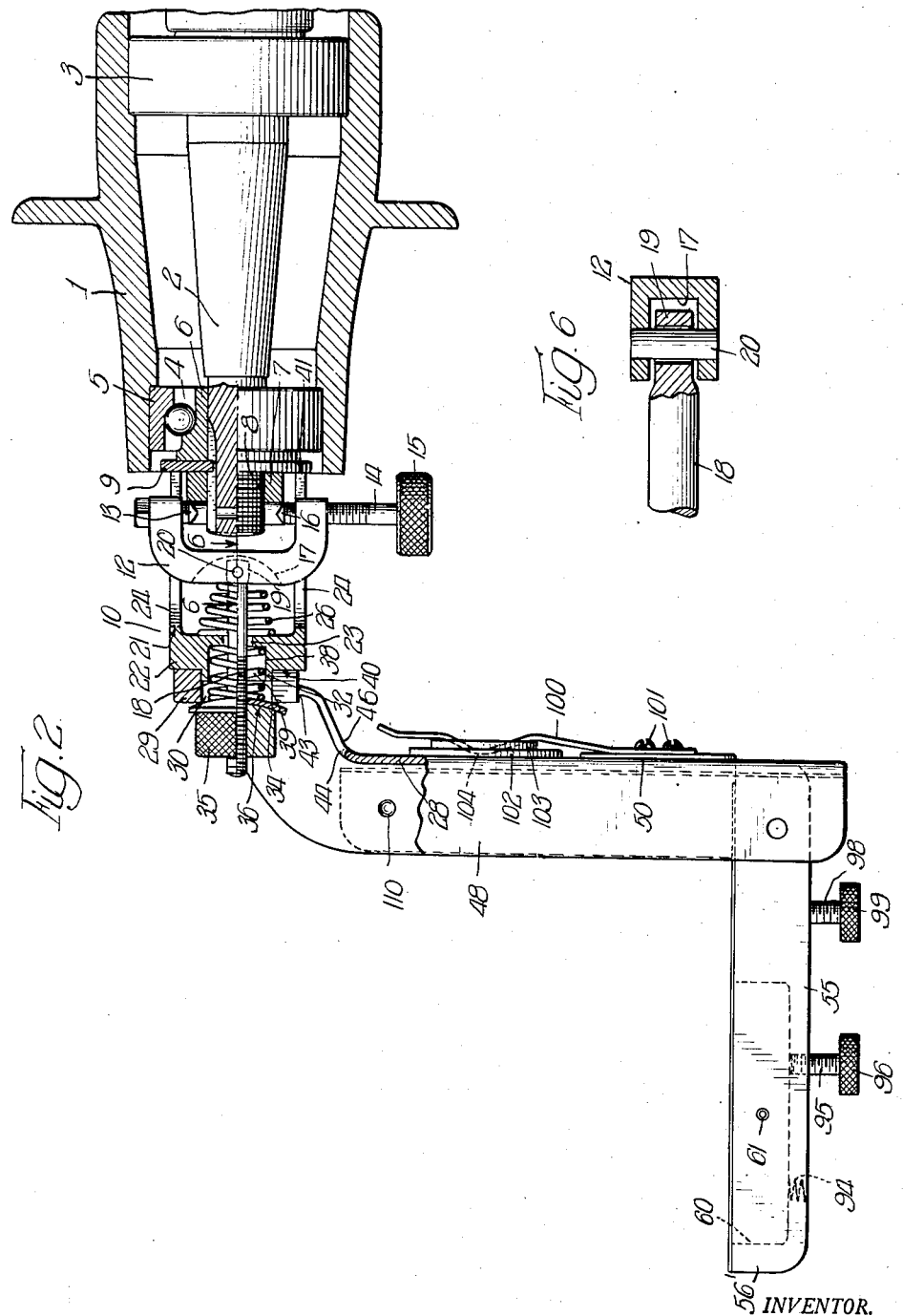

2,831,264

WHEEL ALIGNMENT GAUGE

Ira A. Weaver, Springfield, Ill., assignor to Weaver Manufacturing Company, Springfield, Ill., a corporation of Illinois Application April 30, 1953, Serial No. 352,183

16 Claims. (Cl. 33—203.18)

This invention relates, in general, to wheel alignment gauges for vehicle wheels, and has particular relation to an improved three way gauge for measuring the camber, king pin inclination, and caster of the front wheels of automotive vehicles.

It has been common practice in the automotive industry to journal the front wheels of automotive vehicles on spindles pivotally secured to the outer ends of the axle by pivot pins commonly known as king pins. These king pins are commonly inclined somewhat from the vertical longitudinally of the vehicle to provide for stabilization and ease of steering. This angle of inclination of the king pins from the vertical is known as the "caster."

It is also common to incline the king pins transversely of the vehicle. This is known as king pin inclination.

It is further common to incline the wheel spindles slightly downwardly to set the front wheels of the vehicle somewhat closer together at the bottom than at the top. This is known as cambering. The idea of cambering is to bring the point of contact of the tires with the road more nearly under the steering spindles or king pins, thus permitting the vehicle to be steered more easily.

The king pin inclination angle, in combination with wheel camber, provides a definite built-in wheel lever arm, as designed by the manufacturer, which contributes to a great degree to present day, easy, shock-free steering. King pin inclination should be checked on all wheel alignment jobs if good alignment is to be assured and maintained. Simply checking and adjusting camber, caster and toe-in cannot correct all steering ailments. Moreover, camber preferably should not be corrected without first reading or checking king pin inclination to determine whether adjusting or bending operations are justified, or whether, for example, a bent spindle should be replaced.

While the foregoing is true on king pin type steering front end systems, it is vitally important on ball joint type steering. On ball joint steering, bending operations are not recommended since the spindle extends from the wheel nut to the upper and lower ball joints. Camber adjustment cannot safely be made until it has been determined that king pin inclination has changed equally with camber error. If the spindle is bent, there is no practical way to determine whether the bend is in the bearing area or between the ball joints. The only cure for this then is to replace the bent part.

One of the main objects of the present invention is to provide an improved alignment gauge for the wheels of automotive vehicles which will overcome shortcomings and difficulties encountered with the alignment gauges previously provided.

Another object is to provide an alignment gauge which will afford instant king pin inclination readings so as to uncover bent spindles and prevent unsatisfactory wheel alignment jobs.

Another object is to provide an alignment gauge which, for example, when used in combination with a turning radius gauge will provide not only accurate, but easy and fast, readings of camber, king pin inclination, caster and turning radius.

Another object is to provide an alignment gauge which for correction of both camber and caster angles also takes into account the fact that especially on independent front wheel suspension vehicles, when adjustment is made for caster, the camber and king pin inclination angles are also affected, and vice versa.

Another object is to provide an alignment gauge with which it is possible to watch the simultaneous change of caster and camber angles as adjustment or other type correction is accomplished.

Another object is to provide an alignment gauge which will present all readings so that they may be watched simultaneously in relation to each other and without moving or arranging the device in different positions for different readings so that, for example, only one reading may be watched at a time.

Another object is to provide an alignment gauge having three easy-to-read spirit levels in conjunction with accurately calibrated scales giving quick, direct readings of camber, king pin inclination, caster, caster correction, and camber correction.

Another object is to provide an alignment gauge having one or more spirit levels operating in conjunction with at least two different scales and with the spirit level bubble of one such level cooperating with different scales to give different readings.

Another object is to provide an alignment gauge which may be closed for compactness and to conceal and protect the spirit level or other gauges of the device when not in use.

Further objects and advantages of the invention will be apparent from the following detailed description taken in connection with the accompanying drawings, it being understood that the invention is limited only within the scope of the appended claims and not to the particular embodiment selected for illustration.

In the drawings:

Figure 1 is a fragmentary perspective view of one of the front wheels of an automobile showing the same positioned on a turntable or turning radius gauge for measuring the amount of wheel turn and with the improved alignment gauge of the present application applied to the wheel spindle;

Figure 2 is a fragmentary vertical section taken axially through one of the wheel hubs with the upright member of the gauge applied to the wheel spindle and the gauge carrying part opened to horizontal indicating position;

Figure 3 is an elevational view of the side of the upright member of the gauge which is presented toward the wheel in use and showing the adjacent end of the gauge carrying part as it appears when opened to horizontal indicating position;

Figure 4 is a top plan view of the gauge when opened for use;

Figure 6 is a fragmentary detailed section through the pivotal connection between the threaded stud and the yoke of the adapter clamp taken on the line 6—6 of Figure 2;

Figure 5:
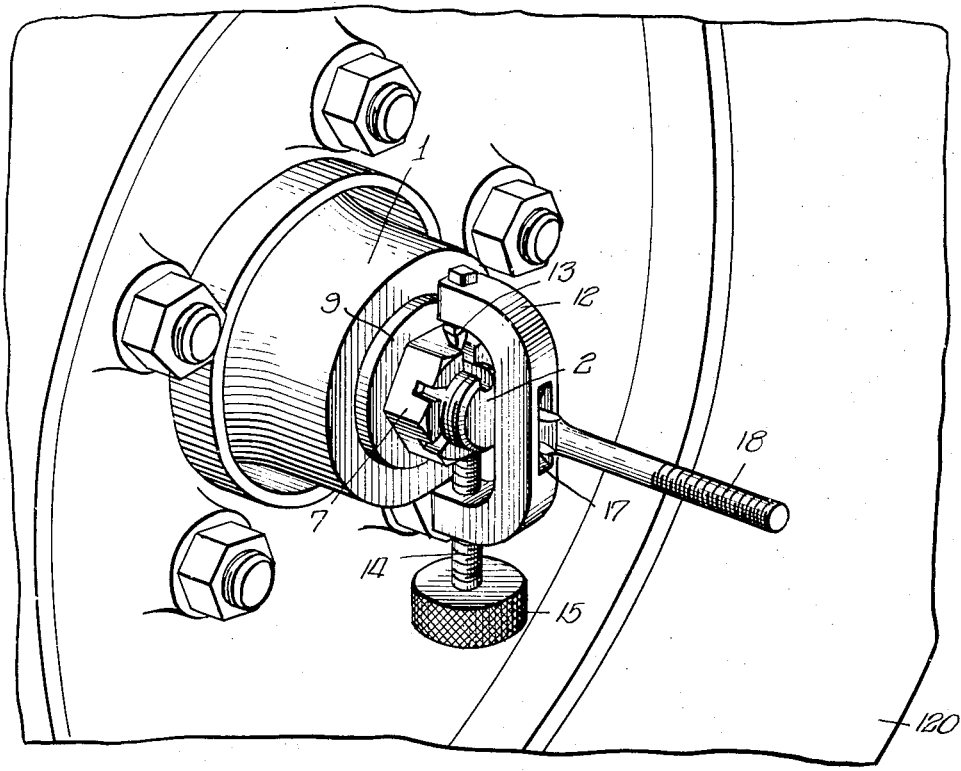
Figure 5 is a perspective view with the adapter sleeve removed to show how the adapter clamp is attached by locating its points in cotter key slots of the spindle nut.
Figure 7:
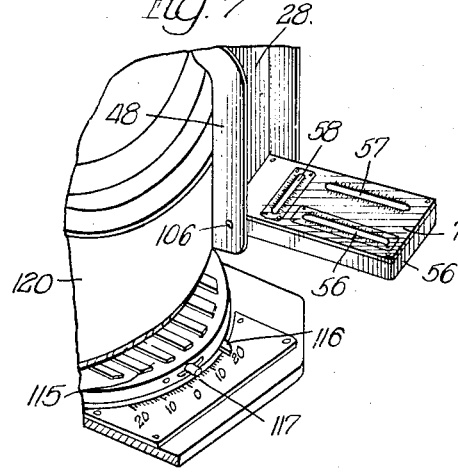
Figure 7 is a fragmentary perspective view showing the wheel turned to a 20° back turn as indicated by the turning radius gauge.

Referring to the drawings, in Figure 2 the reference numeral 1 designates the wheel hub for one of the front wheels of an automotive vehicle.

Within the hub 1 is the wheel spindle 2 provided with an inner bearing 3 and an outer bearing 4. The outer bearing 4 has an outer race 5 and an inner race 6. A spindle nut 7 of castellated form is screwed at 8 on the spindle 2 with a thrust washer 9 interposed between adjacent ends of the inner bearing race 6 and the nut 7. The aforementioned structure is illustrative of one form of such structure as currently employed with size variations on various vehicles.

The embodiment of the gauge of the present application selected for illustration is shown applied to the wheel spindle 2 by an adapter clamp of the form disclosed and claimed in applicant's copending application Serial No. 352,510, filed May 1, 1953, and designated, in general, by the reference numeral 10. The form of the attachment particularly in respect of the details thereof may vary within the scope of the present invention.

In order, however, to make the disclosure of the present application complete in regard to one suitable manner of attaching the gauge of the present application in place, the adapter clamp will be described herein in some detail. It comprises a yoke 12 having a hard pointed set screw or other pointed member 13 fixed in one arm of the yoke. The opposite arm of the yoke 12 contains a threaded hole diametrically opposite the pointed member 13 through which is screwed a screw 14 in axial alignment with the set screw 13. The screw 14 has knurled head 15 at its outer end and is provided at its inner end with a hardened point 16.

The base or intermediate portion of the yoke 12 has a groove 17 which opens outwardly away from the spindle 2. The inner end of the groove 17 may be of rounded or arcuate form as shown, for example, in dotted lines in Figure 2. A threaded stud 18 has a flattened head 19 which enters the groove 17 and is retained therein by a pin 20. The groove 17 is of free fit with the sides of the flattened head 19 and the pin 20 has loose fit in the hole through the head of the stud. Thus, the stud 18 is permitted to pivot a limited amount sidewise due to looseness between the sides of the head of the stud and the sides of the groove 17. Also the groove 17 due to its form and length vertically at its open end as shown in Figure 2 permits the stud 18 to pivot vertically a limited amount about the pin 20. Thus the stud 18 is permitted to swivel freely a limited amount in all directions.

The adapter sleeve 21 is of cylindrical form. One end of this sleeve 21 is open and the opposite end is closed by a relatively thick wall 22 having an axial opening 23 through which the stud 18 passes in applying the sleeve 21 over the yoke 12 and its connected stud 18. The opening 23 is considerably larger than the stud 18 so that the stud may swivel a limited amount about the pin 20 without moving the sleeve 21. Diametrically opposite sides of the cylindrical wall of the adapter sleeve are provided with slots 24, 24 for receiving the ends of the yoke 12. The slots 24 are wide enough to permit the yoke to slide in them as shown in Figures 1 and 2 with relatively close fit.

A conical shaped compression spring 26 is placed over the stud 18 with its smaller end bearing against the yoke 12 and its larger end bearing against the inside of the end wall 22 of the adapter sleeve 21. Thus the spring 26 when under compression tends to push the sleeve 21 endwise away from the yoke 12.

The gauge of the present application has a back plate 28 which is positioned upright when the gauge is applied to a spindle. This back plate 28 has at the top thereof an integral boss 29 provided with an opening 30 which in applying the gauge to the yoke and stud assembly passes over the stud 18 and engages telescopically over an annular flange 32 integral with the end wall 22 of the adapter sleeve 21 about the opening 23. A dished or spherical segment shaped washer 34 has an opening which passes freely over the stud 18 and its convex side engages the boss 29 of the back plate 28 around the periphery of the opening 30. A knurled nut 35 is screwed on the outer end of the stud 18 and preferably has a rounded or spherical segment shaped inner end 36 of the same radius as the concave side of the washer 34 which engages or cooperates with the concave outer side of the washer 34.

The outer surface of the end wall 22 of the sleeve 21 is counterbored as indicated at 38 to receive a helical compression spring 39. This spring 39 is placed over the stud 18 with one end bearing against the end wall 22 at the inner end of the counterbore 38 and its opposite end bearing against the washer 34. The spring 39 is somewhat stronger and has less deflection per unit load than the spring 26. The spring 39 is thus effective to keep the inner end of the adapter sleeve 21 in contact with the thrust washer 9 in applying the gauge to the wheel spindle.

The end surfaces 40 and 41 of the adapter sleeve 21 are parallel to each other. Thus, when the surface 41 is held against any plane surface, such, for example, as the outer plane surface of the thrust washer 9, another plane surface such, for example, as the plane cooperating surface of the boss 29 bearing against the surface 40 will be parallel to the first plane surface against which the surface 41 bears.

The bottom of the boss 29 has a slot 43 opening therethrough from the opening 30 into an opening 44 in the upper end of the gauge plate 28. The opening 44 is preferably sufficiently large to permit passage of the nut 35 and washer 34 therethrough which enables applying the gauge plate 28 to the adapter sleeve 21 without completely unscrewing the nut 35 from the stud 18.

Beneath the boss 29 the gauge plate 28 is offset at 46 outwardly away from the plane seating surface of the boss 29 for clearance purposes. Each of the opposite side edges of the plate 28 has an integral flange 48 and the lower end of these side flanges 48 as the device is shown in Figures 2 and 3 project downwardly below the lower edge 49 (Figure 3) of the plate 28. The side of the plate 28 which is presented toward the wheel of the vehicle in use has a raised plane or parallel surface 50 against which a parallel bar or bars for toe gauge purposes are adapted to be held. The plate 28 has two holes 51 drilled therein to receive dowel pins for positioning such toe gauge bar or bars.

The gauge carrying member 55 comprises a plate having an outstanding marginal flange 56' presenting a generally box-shaped configuration which opens upwardly when the member 55 is horizontally disposed as shown in Figures 1–3. Mounted within the member 55 are three spirit level gauges 56, 57 and 58, the gauges 56 and 57 being disposed parallel with the wheel spindle 2 in use and the gauge 58 being disposed transversely or at right angles to the gauges 56 and 57 and therefore transversely or at right angles to the wheel spindle. The gauge 56 is mounted in fixed position with respect to the member 55 but the gauge 57 is mounted within a box-like member 60 shown in dotted lines in Figure 2, and this member 60 and therefore the gauge 57 is pivoted at 61 in the member 55 for tilting movement about an axis disposed transversely or at right angles to the wheel spindle when the device is in use. The gauge 58 is mounted within a box-like member 62 shown in dotted lines in Figure 3 and this member 62 and therefore the gauge 58 is pivoted at 64 in the member 55 for tilting movement about an axis disposed parallel with the wheel spindle in use.

The box-like member 60 is covered by a gauge plate 65 secured to the member 60 by screw 66 and provided with an elongated opening 67 disposed in use parallel with the wheel spindle and through which the spirit level gauge 57 is visible. The box-like member 62 is covered by a gauge plate 68 secured to the member 62 by screws 69 and provided with an elongated opening 70 disposed in use transversely of the wheel spindle and through which the spirit level gauge 58 is visible. A main gauge plate 72 covers the open top of the member 55 and is secured in place by screws 74. The plate 72 has an opening 75 disposed in use parallel with the wheel spindle and through which the spirit level gauge 56 is visible. The plate 72 also has a second opening 76 through which the gauge 57 and its plate 65 are visible and a third opening 78 through which the gauge 58 and its plate 68 are visible.

The plate 72 has markings 80 forming camber scales along opposite sides of the opening 75, the markings 80 above the zero (0) markings of this scale as the device is shown in Figure 4 being, for example, in black figures with a positive (+) marking at 81 and the markings below the zero (0) markings of this scale being, for example, in red figures with a negative (−) marking at 82. When the bubble of the gauge 56 is in the black figures above the zero (0) markings, the camber reading is positive, and when this bubble is in the red figures below the zero (0) markings, the camber reading is negative. Adjacent to the camber scale markings the plate 72 bears the word "Camber."

The plate 65 has markings 83 forming caster scale markings along the left hand side of the gauge 57 as shown in Figure 4. The markings below the zero (0) marking of this scale as the device is shown in Figure 4 are, for example, in black figures with a positive (+) marking at 84 and the markings above the zero (0) marking of this scale as shown in Figure 4 are, for example, in red figures with a negative (−) marking at 85. When the bubble of the gauge 57 is in the black figures of the scale 83 in determining caster inclination or factor, the caster reading is positive and when this bubble is in the red figures of the scale 83, the caster reading is negative.

The plate 65 also has markings 86 forming camber correction markings along the right hand side of the gauge 57 as shown in Figure 4. The markings above the zero (0) marking of this scale, as the device is shown in Figure 4, are, for example, in black figures with a positive (+) marking at 87 and the markings below the zero (0) marking of this scale as shown in Figure 4 are, for example, in red figures with a negative (−) marking at 88. When the bubble of the gauge 57 is in the black figures of the scale 86, the camber correction reading is positive and when this bubble is in the red figures of the scale 86, the camber correction reading is negative. Adjacent to the caster scale markings 83 the plate bears the word "Caster" and adjacent to the camber correction scale markings 86 the plate 72 bears the words "Camber Correction."

The plate 68 has markings 90 forming king pin inclination markings along the bottom of the opening 70 as the device is shown in Figure 4. While king pin inclination should always be positive, the markings of the scale 90 read in opposite directions from the zero (0) marking. The markings on one side of the zero (0) marking of the scale 90 are for indicating king pin inclination for one front wheel of the vehicle, and the markings on the other side of the zero (0) marking of the scale 90 are for indicating king pin inclination for the opposite front wheel.

The plate 68 also has markings 92 forming caster correction markings along the top of the opening 70 as the device is shown in Figure 4. The markings of the scale 92 read in opposite directions from the zero (0) marking. The markings on one side of the zero (0) marking of the scale 92 are for caster correction for one front wheel of the vehicle, and the markings on the other side of the zero (0) marking of the scale 92 are for caster correction for the opposite front wheel. Adjacent to the king pin inclination scale markings 90 the plate 72 bears the words "King Pin" and adjacent to the caster correction scale markings 92 the plate 72 bears the words "Caster Correction."

A spring 94 between the bottom of the box-like member 60 for the gauge 57 and the inner surface of the member 55 yieldingly urges the member 60 and its gauge 57 clockwise about its pivot 61 as shown in Figure 2. An adjustment screw 95 screwed through the member 55 has at its outer end a knurled head 96 and cooperates at its inner end with the member 60 to swing or tilt this member and its gauge 57 counterclockwise (Figure 2) about the pivot 61 in opposition to the spring 94 to level the gauge 57 or to adjust its inclination.

A spring 97 between the bottom of the box-like member 62 for the gauge 58 and the inner surface of the member 55 yieldingly urges the member 62 and its gauge 58 clockwise about its pivot 64 as shown in Figure 3. An adjustment screw 98 screwed through the member 55 has at its outer end a knurled head 99 and cooperates at its inner end with the member 62 to swing or tilt this member and its gauge 58 counterclockwise (Figure 3) about the pivot 64 in opposition to the spring 97 to level the gauge 58 or to adjust its inclination.

The back of the plate 28 may have a leaf spring 100 secured thereto at its lower end by screws 101 for holding, for example, a pair of ground washers 102 and 103 which, or either one of which, may be slipped over the slotted nut 7 and positioned between the bearing thrust washer 9 and the adjacent end of the adapter sleeve 21 if the bearing thrust washer 9 is too small for proper cooperation with the sleeve 21. The spring 100 is indented at 104 into the opening in the adjacent washer properly and yieldingly to hold the washers in place. The upper free end of the spring 100 is turned outwardly away from the plate 28 so that it may be engaged with the finger for springing the spring 100 away from the plate 28 to release the washers.

The gauge carrying part 55 extends at one end between the depending ends of the flanges 48 of the plate 28 as shown in Figures 2 and 3 and is pivoted thereto by pivot pins 106. Engagement of the top of the pivoted end of the part 55 with the lower edge of the plate 28 at 107 (Figure 3) in opening the gauge limits the opening movement of the part 55 about its pivots 106 to position where part 55 is horizontally disposed. When not in use, the gauge carrying part is adapted to be closed for compactness and to conceal and protect the spirit level gauges. This is accomplished by swinging the part 55 clockwise about its pivots 106 (Figure 2) to its dotted line position. A catch or detent 108 pressed from one side of the part 55 by a spring 109 (Figure 4) engages in an indentation 110 in the adjacent side of the flange 48 as shown in dotted lines in Figure 2 to hold the part 55 in closed position. The part 55 is swung to open position by grasping its upper end at the opening 44 and swinging it to open position, the detent 109 springing out of the indentation 110.

The operation of the illustrated embodiment of the invention is as follows:

The car is first prepared by making sure that it is on a level surface and all tires are inflated to normal pressure. Any looseness in the front end system of the vehicle is eliminated and the vehicle is preferably bounced to obtain normal road position of all springs.

Then, starting with either the right or left front wheel, both the hub cap and the dust cap are removed. The spindle nut 7 is tightened to eliminate any wheel bearing looseness and an excess grease is wiped from the spindle nut and bearing thrust washer.

The adapter clamp is then fastened to the spindle nut 7 as shown in Figure 2 by locating the clamp point 13 and the point of the adjusting screw 14 in opposite castellations or cotter key slots in the nut 7 and firmly tightening the knurled headed adjusting screw. This provides a means for quickly and accurately clamping the adapter sleeve and gauge to the wheel spindle. This is accomplished without removing the adapter sleeve assembly from the gauge, and without removing the spindle nut 7, removal of which nut 7 is not desired by some car manufacturers.

The gauge and adapter sleeve assembly are then held with the inner end of the adapter sleeve 21 against the thrust washer 9 as shown in Figure 1. Making sure that the sleeve 21 is centered on the thrust washer 9, the knurled centering nut 35 is tightened until it holds the gauge firmly against the bearing thrust washer 9. If the bearing thrust washer diameter is too small properly to fit the adapter sleeve 21, one of the special ground washers 102, 103 may be slipped over the slotted nut 7 between the thrust washer 9 and the adjacent end of the adapter sleeve.

In rare instances, it may be necessary to fasten the gauge directly against the bearing thrust washer without using the adapter assembly. In these few cases the spindle nut is removed and the gauge is put on the spindle against the thrust washer inserting one of the protective washers between the gauge and the nut. The spindle nut is then tightened sufficiently securely to hold the gauge.

Figure 8:
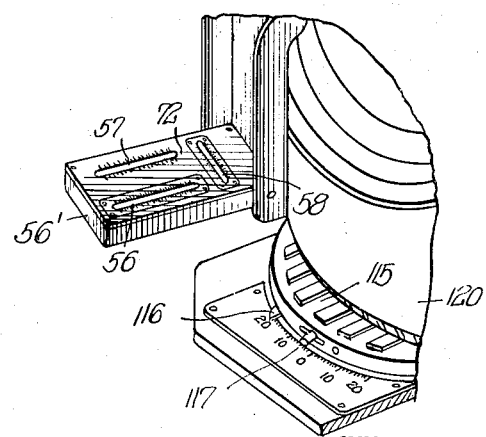
Figure 8 is a fragmentary perspective view showing the wheel turned to a 20° forward turn.

Then, with the wheels straight ahead and the car weight resting on the turning radius gauges one of which is shown at 115 in Figure 1, both turning radius gauges are adjusted to position their pointers at the zero (0) markings of their scales, one pointer being shown at 116 and its cooperating scale at 117 in Figure 8. Then, with the gauge member 55 horizontally disposed as shown in Figures 1 and 2, the gauge is checked to see that the gauge part 55 is approximately level. To level the member 55 and plate 72, the king pin inclination scale and level are adjusted flush with the plate by the screw 98 and the guage is moved sidewise (Figure 1) until the bubble of the gauge 58 is at zero (0).

The camber reading is read by noting the position of the spirit level 56 with reference to the camber scale. As previously set forth, the reading is positive (+) if the bubble is in the black figures and negative (—) if in the red figures. A check sheet record is made of the camber reading for the wheel just checked. The entire operation is repeated as outlined for the opposite front wheel and camber for that wheel is read and noted.

With both gauges remaining in camber position, the wheel for which the camber reading was last taken is turned to a 20° back turn as indicated by the turning radius gauge. Both caster and king pin inclination spirit level bubbles are then set to zero (0) and the wheel indicated at 120 is turned to a 20° forward turn as indicated by the turning radius gauge. The caster and king pin inclination angles are read by noting the positions of the respective spirit level bubble centers with reference to their scales and a check sheet record is made of the caster and king pin inclination readings.

The person gauging the inclinations then steps to the opposite side of the vehicle and reads the turning radius for that wheel. A check sheet record of the turning radius readings is made. It will be found that the wheel for which the turning radius was last read is very near the required 20° back turn position for starting caster and king pin inclination check. This wheel is then moved to exactly 20° back turn and the procedure for reading caster, king pin inclination and turning radius as previously outlined is repeated.

There is now a written record of camber, king pin inclination, caster and turning radius for analysis of these factors to determine what corrections, if any, are needed. If the camber has either decreased or increaesd by an appreciable amount and the king pin inclination has remained at factory specifications, the check has uncovered a bent spindle and the only cure is to replace it following which camber should return to normal. On the other hand, if camber has changed from factory specifications, for example, by one degree, then if the king pin inclination has decreased by a like amount, the test indicates that there is no bent spindle and camber correction may be proceeded with either by adjustment or on vehicles having conventional king pin type steering independent front wheel suspension by bending the king pin support. If the reverse of the above example is the case and camber has decreased by some amount and king pin inclination has increased by a like amount, it is also certain that no bent spindle is present.

For vehicles having ball joint type steering independent front wheel suspension, since no king pin nor king pin support member is employed, no bending for camber correction is recommended. Therefore, only when camber has reduced and king pin inclination has increased by a like amount, or when camber has increased and king pin inclination has reduced by a like amount, should camber be corrected by adjustment and without replacing a bent spindle.

If, after analysis, it is determined that no bent spindle is present and that either camber or caster, or both, require correction, the easiest and fastest method is to remove the wheel on the side for which camber or caster is to be corrected. This method relieves all strain on the adjustment means and even more important, it gives complete accessibility to the adjustment devices. The alignment gauge of the present application does not depend on the wheel hub, the rim or tire side-wall for mounting, but rather it is mounted on the spindle and therefore provides a constant check on both camber and caster as the adjustments are made, either with the wheels removed or with the vehicle weight on the wheels.

Because of modern motor vehicle front fender design, it is easier and faster to make camber and/or caster adjustments with the wheel removed for accessibility. In such case, the vehicle wheels are turned straight ahead (zero on the turning radius gauges) and the wheel for which correction is to be made is then jacked up high enough to clear the turning radius gauge. The jack preferably should be under the lower control arm and as near the wheel as possible. The wheel is then removed and the outer wheel bearing and bearing thrust washer are replaced on the spindle in the same position as used in the wheel hub. The adapter clamp assembly is removed from the gauge and the gauge is placed on the spindle against the thrust washer. A protective washer is preferably used between the gauge and spindle nut, and the spindle nut is tightened sufficiently securely to hold the gauge in position.

The camber correction scale spirit level bubble is then adjusted to correspond with the check sheet record of existing camber for that wheel. Then, the caster correction scale spirit level bubble is adjusted to correspond with the check sheet record of existing caster for that wheel. For positive (+) caster, set the bubble toward the front of the car, and for negative (—) caster, toward the rear of the car. The locking means for the built-in camber and/or caster adjustments is then loosened and corrections may now be made by changing the vehicle built-in adjustments. When the desired camber and caster readings are indicated on the respective three way gauge correction scales, the adjustment operation is completed, whereupon the locking means which holds the vehicle built-in adjustments are tightened and the wheel is replaced.

In correcting for camber by straightening of the spindle support, the gauge is firmly attached or otherwise applied to the spindle from which the wheel has been removed and for which camber correction is to be made. The camber correction scale spirit level bubble is then adjusted to correspond with the check sheet record of camber for that wheel. Then, camber correction is accomplished by watching the camber correction spirit level bubble as the bending operation proceeds—frequently relieving bending pressure on parts—to assure that the camber reading is finally at the desired point on the gauge.

If it is desired to correct camber and caster without removing the wheels and by using the built-in vehicle adjustment, with the gauge in normal position the wheels are turned straight ahead (zero on the turning radius gauges). Camber will now read identically with the check sheet record. The caster correction scale spirit level bubble is then adjusted to correspond with the check sheet record of existing caster for that wheel. For positive (+) caster, the bubble is set toward the front of the car and for negative (−) caster, the bubble is set toward the rear of the car.

The foregoing operation is repeated for the opposite wheel, setting the caster correction scale spirit level bubble for that wheel to correspond with the check sheet record of it. Camber and/or caster adjustments may now be made for either or both wheels. For independent front wheel suspension vehicles, camber ordinarily cannot be changed by adjustment without affecting caster. Nor can caster be changed without affecting camber. The alignment gauge of the present application permits watching the change of both angles as they simultaneously occur and therefore obtaining the best possible combination of camber and caster with the adjustments provided by the vehicle manufacturer.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

I claim:

1. A gauge for indicating camber, king pin and caster inclinations of a vehicle wheel and camber and caster corrections, comprising, in combination, a gauge body, means for attaching said gauge body in gauging position, a first spirit level carried by said gauge body, second and third spirit levels carried by said gauge body in positions parallel to each other and transverse to said first spirit level, said first spirit level having a first scale for indicating king pin inclination and a second scale for indicating caster correction, said second spirit level being fixed in said gauge body and having a scale for indicating camber inclination, said third spirit level having a first scale for indicating caster inclination and a second scale for indicating camber correction, means for angularly adjusting said third spirit level to indicate on said camber correction scale the camber inclination as determined by said camber inclination scale whereby to indicate by said third spirit level the amount of adjustment required for correcting camber inclination, and means for angularly adjusting said first spirit level to indicate on said caster correction scale the caster inclination as determined by said caster inclination scale whereby simultaneously to indicate by said first spirit level the amount of adjustment required for correcting caster inclination.

2. A gauge according to claim 1 wherein the means for adjusting the first and third spirit levels relative to said caster correction and camber correction scales are also adapted for angularly adjusting said first and third spirit levels to zero positions with respect to their king pin inclination and caster inclination scales in determining king pin and caster inclinations.

3. A gauge according to claim 1 wherein the gauge body is pivotally carried on the lower end of a back plate for swinging movement to closed position with said spirit levels covered and protected by said back plate and to position extending horizontally from said back plate with said spirit levels upwardly exposed, and means at the upper end of said back plate for securing said back plate in vertically depending position against a surface substantially normal to the axis of a spindle for the wheel.

4. A gauge for indicating at least two different inclinations of a vehicle wheel, comprising, in combination, a gauge body, a first spirit level carried by said gauge body and having a scale for indicating a first inclination, said first spirit level being transversely disposed with respect to the wheel when the gauge is in gauging position a second spirit level carried by said gauge body and disposed transverse to said first spirit level and longitudinally with respect to the wheel when the gauge is in gauging position, said second spirit level having a first scale for indicating a second inclination and a second differently graduated scale for indicating correction of the inclination indicated by the scale of said first spirit level, and means for angularly adjusting said second spirit level to indicate on its second scale the inclination as determined on the scale of said first spirit level whereby to indicate by said second spirit level the amount of adjustment required for correcting the inclination as determined on the scale of said first spirit level.

5. A gauge for indicating camber, king pin and caster inclinations of a vehicle wheel having a wheel spindle and a first plane surface substantially normal to the axis of said spindle; said gauge comprising a back plate having outstanding side flanges and a plane surface at the upper end thereof, means at the upper end of said back plate for fastening the plane surface of said back plate against said first plane surface with said back plate in vertically depending position, a gauge carrying member, a first spirit level for determining camber fixed in said gauge carrying member parallel to the plane thereof, a second spirit level for determining caster pivoted in said gauge carrying member for tilting movement in a plane parallel to said first spirit level, a third spirit level for determining king pin inclination pivoted in said gauge carrying member for tilting movement in a plane transverse to said first and second spirit levels, means for angularly adjusting said second and third spirit levels, means pivoting said gauge carrying member between the lower ends of the flanges of said back plate for swinging movement to closed position between said flanges and to open position disposed horizontally with said spirit levels upwardly exposed, and a spring catch for holding said gauge carrying member in closed position.

6. A gauge for indicating king pin and caster inclinations of a vehicle wheel and caster correction, comprising, in combination, a gauge body, means for attaching said gauge body in gauging position, a first spirit level fixed generally parallel with the wheel plane at all times the gauge is in gauging position, a second spirit level carried by said gauge body in position transverse to said first spirit level, said first spirit level having a first scale for indicating king pin inclination and a second scale for indicating caster correction, said second spirit level having a scale for indicating caster inclination, and means for angularly adjusting said first spirit level to indicate on said caster correction scale the caster inclination as determined by said caster inclination scale whereby to indicate by said first spirit level the amount of adjustment required for correcting caster inclination.

7. In a wheel checking gauge, a gauge body having horizontal gauging position, means for attaching said gauge body in gauging position with respect to the axis of a vehicle spindle, a first pair of spirit levels arranged in said gauge body generally transverse to the wheel plane and exposed upwardly when said gauge body is in horizontal gauging position, and an adjustable spirit level arranged in said gauge body generally parallel with the wheel plane and transverse to said first pair of spirit levels; also exposed upwardly when said gauge body is in gauging position, means for adjusting said adjustable spirit level to the reading obtained on one of said first spirit levels for correction of the angularity shown by one of said first spirit levels, and means for adjusting one of said first spirit levels to the reading obtained on the other of said first spirit levels for correction of the angularity shown by the other of said first spirit levels.

8. In a wheel checking gauge, a gauge body having horizontal gauging position and of generally box-shaped configuration opening upwardly in gauging position, a gauge plate covering said gauge body and provided with an elongated slot extending transverse to the wheel plane, a first spirit level mounted behind said slot, said gauge plate having a first enlarged and elongated opening paralleling said slot and a second enlarged and elongated opening generally parallel with the wheel plane and transverse to said first opening, a first holder pivotally mounted in said gauge body below said first opening on a transverse pivot below said gauge plate and having an elongated slot therein with a second spirit level behind the same, a second holder pivotally mounted on said gauge body below said second opening on a transverse pivot and having an elongated slot therein with a third spirit level behind the same, means for adjusting the holder for said second spirit level to indicate on said second spirit level the reading obtained on said first spirit level, and means for adjusting the holder for said third spirit level to indicate on said third spirit level the reading obtained on said second spirit level.

9. In a wheel checking gauge, a gauge body having horizontal gauging position, means for attaching said gauge body in gauging position with respect to the axis of a wheel spindle, a first spirit level for one gauging factor arranged in said gauge body generally transverse to the wheel plane and exposed upwardly when said gauge body is in horizontal gauging position, means for adjusting said first spirit level to another gauging factor for correction of same, a second spirit level arranged in said gauge body generally parallel with the wheel plane and transverse to said first spirit level; also exposed upwardly when said gauge body is in gauging position, and means for adjusting said second spirit level to the reading obtained on said first spirit level for correction of the angularity shown by said first spirit level.

10. In a wheel checking gauge, a gauge body having horizontal gauging position, means for attaching said gauge body in gauging position with respect to the axis of a wheel spindle, a first spirit level for one gauging factor arranged in said gauge body generally transverse to the wheel plane and exposed upwardly when said gauge body is in horizontal gauging position, a second spirit level arranged in said gauge body generally parallel with the wheel plane and transverse to said first spirit level; also exposed upwardly when said gauge body is in gauging position, and means for adjusting said second spirit level to the reading obtained on said first spirit level for correction of the angularity shown by said first spirit level.

11. In a wheel checking gauge, a back plate provided at the top thereof with an apertured boss having a planar inner surface for abutment with another planar surface when the gauge is applied to a wheel spindle, outstanding flanges along the opposite sides of said back plate, a generally box-shaped gauge body extending at one end between the lower ends of said flanges and pivoted thereto for swinging movement to horizontal position for wheel gauging purpose and to position parallel with said back plate and nested between said flanges when the gauge is not in use, detent means for yieldingly holding said gauge body in its nested position between said flanges, a first pair of spirit levels arranged in said gauge body generally transverse to the wheel plane and exposed upwardly when said gauge body is in horizontal gauging position, and an adjustable spirit level arranged in said gauge body generally parallel with the wheel plane and transverse to said first pair of spirit levels; also exposed upwardly when said gauge body is in horizontal gauging position and adjustable to the reading obtained on one of said first pair of spirit levels for correctness of the angularity shown by one of said first spirit levels, one of said first spirit levels being adjustable to the reading obtained on the other of said first spirit levels for correction of the angularity shown by said other of said first spirit levels.

12. A wheel checking gauge according to claim 11 wherein the top of the back plate is offset rearwardly adjacent to said apertured boss to provide a recess for receiving a nut for securing the gauge in gauging position with respect to a wheel spindle.

13. A wheel checking gauge according to claim 11 wherein the top of the back plate is offset rearwardly adjacent to said apertured boss to provide a recess for receiving a nut for securing the gauge in gauging position with respect to a wheel spindle, the offset portion of said back plate having an opening with a slot leading from said opening to the aperture in said boss for reception of the nut and a threaded gauge attaching stud without completely removing the nut from said stud.

14. A wheel checking gauge according to claim 11 wherein there is a spring retainer on the back of the back plate for removably retaining means for adjusting the attachment of the gauge to the wheel spindle.

15. A gauge for indicating camber and caster inclinations of a vehicle wheel and camber correction, comprising, in combination, a gauge body, means for attaching said gauge body in gauging position, a first spirit level fixed in said gauge body and disposed generally transverse to the wheel plane, a second spirit level carried by said gauge body in position parallel to said first spirit level, said first spirit level having a scale for indicating camber inclination, said second spirit level having a first scale graduated in opposite directions from a zero position for indicating caster inclination and a second scale graduated in opposite directions from a different zero position for indicating camber correction, means for angularly adjusting said second spirit level to indicate on said camber correction scale the camber inclination as determined by said camber inclination scale whereby to indicate by said second spirit level the amount of adjustment required for correcting camber inclination, said means for attaching said gauge body in gauging position including a back plate on the lower end of which the gauge body is pivotally carried for swinging movement to closed position with said spirit levels covered and protected by said back plate and to position extending horizontally from said back plate with said spirit levels upwardly exposed, said back plate being of a length less than the radius of the wheel to space said gauge body above the vehicle supporting surface when said gauge body is in gauging position, and means at the upper end of said back plate for securing said back plate in vertically depending position against a surface substantially normal to the axis of a spindle for the wheel.

16. A gauge for indicating king pin and caster inclinations of a vehicle wheel and caster correction, comprising, in combination, a gauge body, means for attaching said gauge body in gauging position, a first spirit level fixed generally parallel with the wheel plane at all times the gauge is in gauging position, a second spirit level carried by said gauge body in position transverse to said first spirit level, said first spirit level having a first scale for indicating king pin inclination and a second scale for indicating caster correction, said second spirit level having a scale for indicating caster inclination, and means for angularly adjusting said first spirit level to indicate on said caster correction scale the caster inclination as determined by said caster inclination scale whereby to indicate by said first spirit level the amount of adjustment required for correcting caster inclination, said means for adjusting the first spirit level relative to the caster correction scale being also adapted for adjusting said first spirit level to zero position with respect to said king pin inclination scale in determining king pin inclination.

References Cited in the file of this patent

UNITED STATES PATENTS

| | | |
|---|---|---|
| 2,115,347 | Sutton | Apr. 26, 1938 |
| 2,194,995 | Bergquist | Mar. 26, 1940 |
| 2,308,808 | Graham | Jan. 19, 1943 |
| 2,502,232 | Oscar | Mar. 28, 1950 |
| 2,645,860 | Bender et al. | July 21, 1953 |
| 2,729,896 | Rosenblum | Jan. 10, 1956 |

FOREIGN PATENTS

| | | |
|---|---|---|
| 121,493 | Sweden | Apr. 20, 1948 |